(12) United States Patent
Tsuboi

(10) Patent No.: US 9,348,543 B2
(45) Date of Patent: May 24, 2016

(54) NETWORK SYSTEM, DISTRIBUTION SYSTEM, CONTROL METHOD, AND STORAGE MEDIUM FOR MANAGING FIRMWARE

(71) Applicant: CANON KABUSHIKI KAISHA, Tokyo (JP)

(72) Inventor: Masanori Tsuboi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 14/338,372

(22) Filed: Jul. 23, 2014

(65) Prior Publication Data

US 2015/0043029 A1 Feb. 12, 2015

(30) Foreign Application Priority Data

Aug. 8, 2013 (JP) ................... 2013-165170

(51) Int. Cl.
*G06F 3/12* (2006.01)
(52) U.S. Cl.
CPC .............. *G06F 3/123* (2013.01); *G06F 3/1211* (2013.01); *G06F 3/1285* (2013.01)
(58) Field of Classification Search
CPC ...... G06F 3/123; G06F 3/1211; G06F 3/1285
USPC ........................................................ 358/1.15
See application file for complete search history.

(56) References Cited

U.S. PATENT DOCUMENTS

| | | | |
|---|---|---|---|
| 6,607,314 B1 * | 8/2003 | McCannon et al. | 400/62 |
| 6,930,785 B1 * | 8/2005 | Weyand et al. | 358/1.1 |
| 6,990,659 B1 * | 1/2006 | Imai | 717/171 |
| 7,146,412 B2 * | 12/2006 | Turnbull | 709/220 |
| 7,203,723 B2 * | 4/2007 | Ogawa | 709/203 |
| 7,516,450 B2 * | 4/2009 | Ogura | H04L 29/06 717/168 |
| 7,595,902 B2 * | 9/2009 | Yamaguchi et al. | 358/1.15 |
| 7,814,480 B2 * | 10/2010 | Sakuda et al. | 717/173 |
| 7,913,246 B2 * | 3/2011 | Hammond et al. | 717/173 |
| 2004/0145766 A1 * | 7/2004 | Sugishita | G06F 8/65 358/1.13 |
| 2006/0215221 A1 * | 9/2006 | Suzuki et al. | 358/1.15 |
| 2009/0161143 A1 * | 6/2009 | Nakamoto | G06F 11/1433 358/1.14 |
| 2009/0187900 A1 * | 7/2009 | Nakamoto | 717/168 |
| 2009/0251730 A1 * | 10/2009 | Yamaguchi | H04N 1/00204 358/1.15 |
| 2012/0062944 A1 * | 3/2012 | Nakamoto | 358/1.15 |
| 2012/0062948 A1 * | 3/2012 | Nishikawa | 358/1.15 |

FOREIGN PATENT DOCUMENTS

JP 2006-243905 A 9/2006

* cited by examiner

*Primary Examiner* — Ngon Nguyen
(74) *Attorney, Agent, or Firm* — Carter, DeLuca, Farrell & Schmidt, LLP

(57) ABSTRACT

An image forming apparatus of a network system requests a distribution system for firmware, acquires the firmware from the distribution system, applies the firmware, and notifies the distribution system about version information for specific firmware relating to a function that performs application time designation. The distribution system of the network system manages version information for the firmware based on a notice from the image forming apparatus, provides a screen for a distribution setting for the firmware with the image forming apparatus, provides a first screen on which the time designation for applying the firmware is enabled, or a second screen on which the time designation is disabled by switching the screens for each of the plurality of image forming apparatuses based on the version information for the specific firmware managed.

13 Claims, 13 Drawing Sheets

FIG. 4
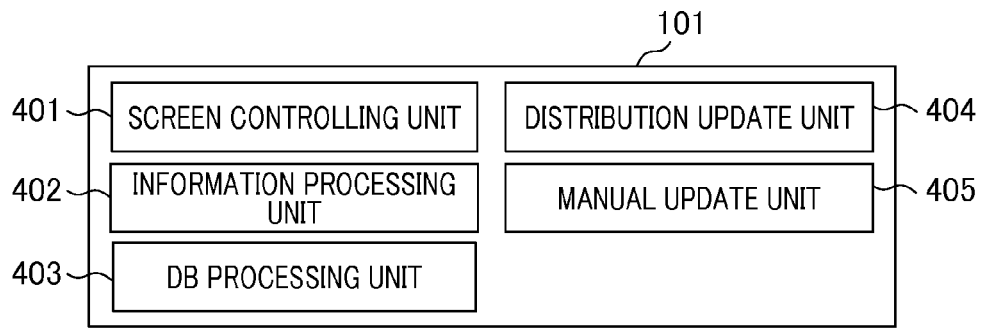
FIG. 5
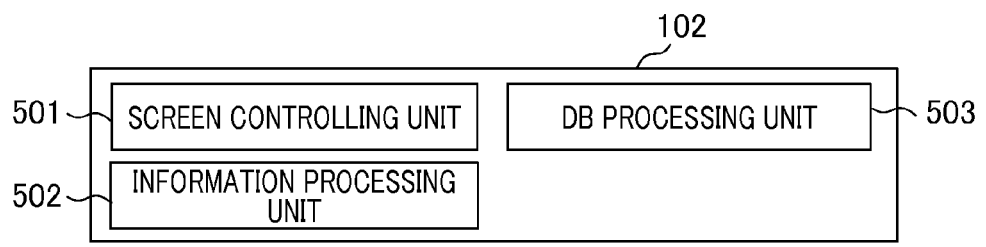
FIG. 6
| Model | Individual number |
|---|---|
| Model A | AAA00000～AAA99999 |
| Model B | BBB00000～BBB99999 |
| Model C | CCC00000～CCC99999 |

FIG. 7

| | 700 701 | 702 |
|---|---|---|
| | Individual number | Version |
| 711 | AAA00000 | V19.00 |
| 712 | BBB11111 | V1.00 |
| 713 | CCC11111 | V1.00 |

FIG. 8

| | 800 801 | 802 |
|---|---|---|
| | Model | Application time designating function |
| 811 | Model A | from V10.00 |
| 812 | Model B | × |
| 813 | Model C | × |

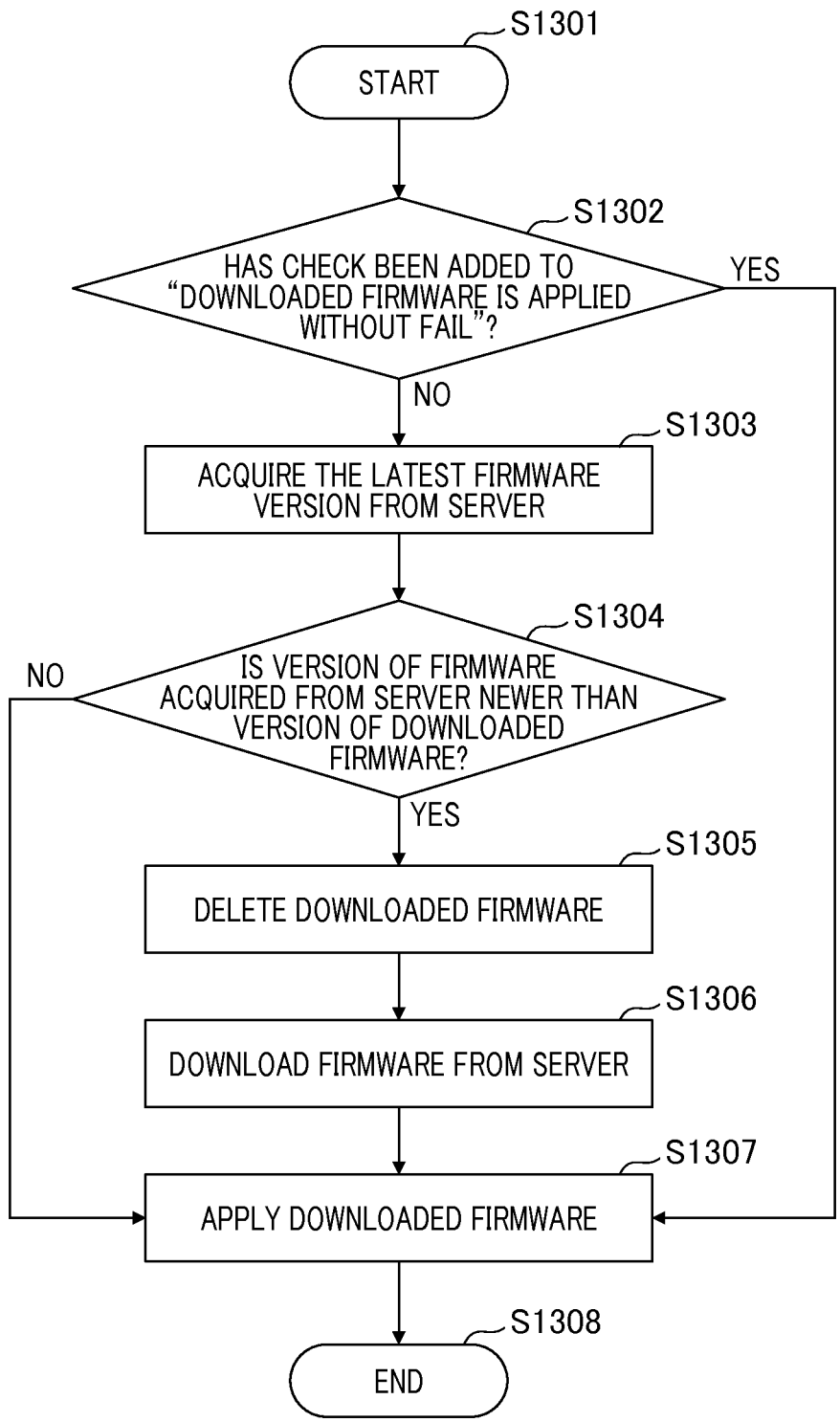

FIG. 14A

| Individual number | Version |
|---|---|
| AAA00000 | V19.00 |
| BBB11111 | V1.00 |

FIG. 14B

| Individual number | Version |
|---|---|
| AAA00000 | V19.00 |
| BBB11111 | V1.00 |
| CCC11111 | V2.00 |

FIG. 14C

| Individual number | Version |
|---|---|
| AAA00000 | V19.00 |
| BBB11111 | V1.00 |
| CCC11111 | V3.00 |

FIG. 15A

| Model | Application time designating function |
|---|---|
| Model A | V10.00 |
| Model B | × |

FIG. 15B

| Model | Application time designating function |
|---|---|
| Model A | V10.00 |
| Model B | × |
| Model C | V2.00 |

FIG. 15C

| Model | Application time designating function |
|---|---|
| Model A | V10.00 |
| Model B | × |
| Model C | × |

FIG. 16A

| | Model | Application time designating function |
|---|---|---|
| 1601 | Model A | V10.00 |
| 1602 | Model B | × |
| 1603 | Model C | V2.00 |

FIG. 16B

| | Model | Application time designating function |
|---|---|---|
| 1601 | Model A | V10.00 |
| 1602 | Model B | × |
| 1603 | Model C | V1.00 |

FIG. 16C

| | Model | Application time designating function |
|---|---|---|
| 1601 | Model A | V10.00 |
| 1602 | Model B | × |
| 1603 | Model C | V2.00 |

FIG. 16D

| | Model | Application time designating function |
|---|---|---|
| 1601 | Model A | V10.00 |
| 1602 | Model B | × |
| 1603 | Model C | V2.00 |

NETWORK SYSTEM, DISTRIBUTION SYSTEM, CONTROL METHOD, AND STORAGE MEDIUM FOR MANAGING FIRMWARE

BACKGROUND OF THE INVENTION

1. Field of the Invention

The present invention relates to a method and a storage medium for providing, by a distribution system connected to an image forming apparatus via a network, a screen for designating a time for updating firmware.

2. Description of the Related Art

There is a case where firmware loaded into an image forming apparatus is updated for adding a new function, correcting a program, or the like. As a method for updating the firmware, there has been proposed a technique in which instructions for an update are provided by an operation unit of an image forming apparatus or a distribution system connected to the image forming apparatus via a network. Since the image forming apparatus is unavailable during an update of the firmware, the image forming apparatus generally updates the firmware in the middle of the night, when the frequency of use is low.

Japanese Patent Laid-Open No. 2006-243905 proposes a method for designating an update time for the firmware, and updating the firmware of the image forming apparatus.

However, in the method disclosed in Japanese Patent Laid-Open No. 2006-243905, when a power source of the image forming apparatus is off, update cannot be implemented at the designated update time. Also, this method does not consider a condition in which the firmware of the image forming apparatus that does not have a function for designating the update time is switched to the firmware of a version that can designate the update time.

SUMMARY OF THE INVENTION

A system of the present invention provides an appropriate version upgrade setting screen with an image forming apparatus by managing version information for firmware capable of time designation.

A network system of an embodiment of the present invention is provided with a plurality of image forming apparatuses and a distribution system that manages firmware of the plurality of image forming apparatuses. The plurality of image forming apparatuses includes a requesting unit configured to request the distribution system for firmware; an acquiring unit configured to acquire the firmware from the distribution system that responds to the request; an applying unit configured to apply the acquired firmware; and a notifying unit configured to notify the distribution system about version information for specific firmware relating to a function that performs time designation that the applying unit applies. The distribution system includes a managing unit configured to manage the version information for the specific firmware based on a notice from each of the plurality of image forming apparatuses; and a providing unit configured to provide a screen for performing a distribution setting of the firmware with any one of the plurality of image forming apparatuses. The providing unit provides a first screen on which the time designation for applying the firmware is enabled, or a second screen on which the time designation is disabled by switching the screens for each of the plurality of image forming apparatuses based on the version information for the specific firmware managed by the managing unit.

Further features of the present invention will become apparent from the following description of exemplary embodiments (with reference to the attached drawings).

BRIEF DESCRIPTION OF THE DRAWINGS

FIG. 4 illustrates an example of a software configuration of the image forming apparatus.

FIG. 5 illustrates an example of a software configuration of the distribution system.

FIG. 6 illustrates an individual number and a model managed by the distribution system.

FIG. 7 illustrates an individual number and a corresponding version thereof managed by the distribution system.

FIG. 8 illustrates a corresponding relationship managed by the distribution system between a model and a version having an application time designating function.

FIG. 13 is a flowchart of processing by the image forming apparatus when an application time is reset.

FIG. 14A to FIG. 14C are diagrams illustrating examples of the DBs 700 in the distribution system.

FIG. 15A to FIG. 15C are diagrams illustrating examples of the DBs 800 in the distribution system.

FIG. 16A to FIG. 16D are diagrams illustrating examples of the DBs 800 in the distribution system.

DESCRIPTION OF THE EMBODIMENTS

Below, a description will be given of an embodiment of the present invention with reference to the figures. Configuration elements described in the embodiment are merely examples, and the applicable scope of the present invention is not limited thereto.

Figure 1:
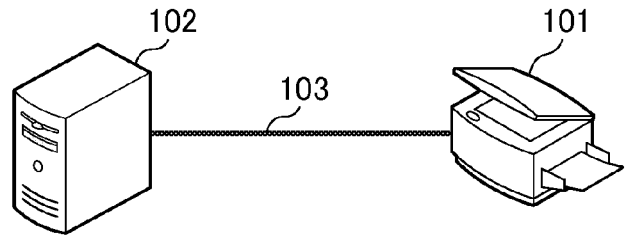
FIG. 1 illustrates an example of a network system configuration according to the present invention.

FIG. 1 is a diagram illustrating an example of a network system configuration of the present invention. The network system shown in FIG. 1 includes an image forming apparatus 101 and a distribution system 102. In the embodiment, the image forming apparatus 101 is a multifunctional peripheral combining functions such as a printer, a scanner, a copy, a facsimile, and the like, by one device. Naturally, the image forming apparatus 101 may be a device having only the printer function or the fax function. In FIG. 1, the image forming apparatus 101 and the distribution system 102 are shown one by one, but the network system may include the plurality of image forming apparatuses and distribution systems. Also, the image forming apparatus 101 has a unique individual number allocated to each image forming apparatus.

The distribution system 102 distributes model-specific firmware to each of the plurality of image forming apparatuses 101. The distribution system 102 also retains information about the individual number, a model, and a version in each database shown in FIG. 6, FIG. 7, and FIG. 8, described below, so as to manage the firmware of the image forming apparatus 101. The image forming apparatus 101 and the distribution system 102 can communicate with each other via a network 103 such as an Internet.

Figure 2:
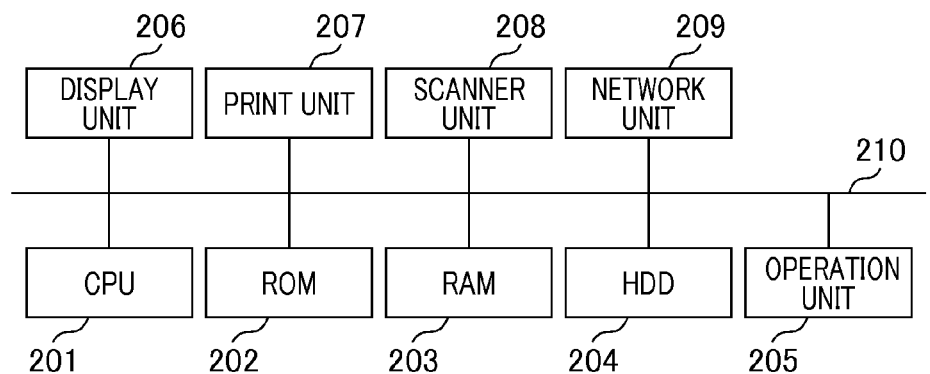
FIG. 2 illustrates an example of a hardware configuration of an image forming apparatus.

FIG. 2 is a diagram illustrating a hardware configuration configuring the image forming apparatus 101. The image forming apparatus 101 includes a CPU 201, a ROM 202, a RAM 203, an HDD 204, an operation unit 205, a display unit 206, a print unit 207, a scanner unit 208, and a network unit 209. The CPU (Central Processing Unit) 201 is a unit that executes various programs to thereby realize different functions described in the embodiment. The ROM (Read Only Memory) 202 is a unit that stores various programs. The RAM (Random Access Memory) 203 is a system working memory on which the CPU 201 operates and temporarily stores various data. The CPU 201 loads the programs stored in the ROM 202 into the RAM 203 and executes them. This RAM 203 is configured by a FRAM (registered trademark) and a SRAM that can retain stored contents after a power source is turned off, a DRAM of which stored contents are deleted after the power source is turned off, and the like.

The HDD (Hard Disk Drive) 204 is a unit that stores various programs. The CPU 201 loads the programs stored on the HDD 204 into the RAM 203, and executes them. Also, data in the RAM 203 may be stored on the HDD 204.

The operation unit 205 is a unit on which a user can provide instructions about printing or set a version upgrade of firmware by operating the image forming apparatus 101. The display unit 206 is a unit for displaying a UI of the image forming apparatus. The print unit 207 can transmit/receive data to/from each unit via a bus 210. Note that the print unit 207 is a unit that can print various image data such as raster image to a storage medium, transmit such data to an external device, or communicate with the distribution system 102. The scanner unit 208 is a unit that reads a manuscript disposed on a platen so as to generate image data. The network unit 209 is a unit for connecting to the distribution system 102. The units described above can transmit/receive data with each other via the bus 210.

Figure 3:
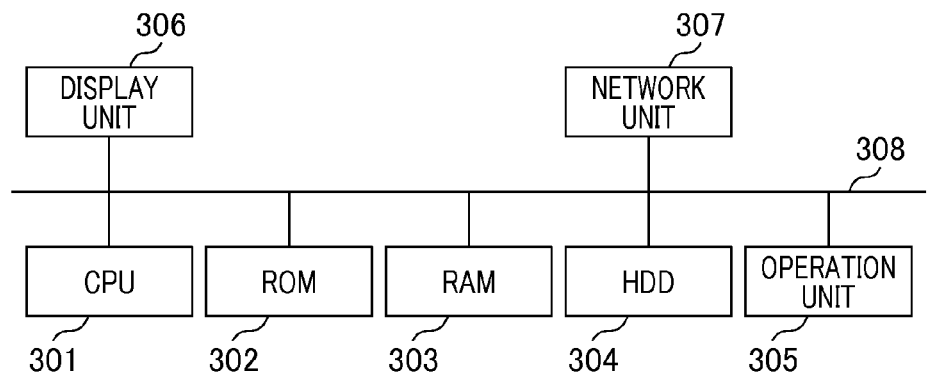
FIG. 3 illustrates an example of a hardware configuration of a distribution system.

FIG. 3 is a diagram illustrating a hardware configuration configuring the distribution system 102. The distribution system 102 includes, as the hardware configuration, a CPU 301, a ROM 302, a RAM 303, an HDD 304, an operation unit 305, a display unit 306, and a network unit 308. The CPU 301 to the display unit 306, and a bus 308 have the same functions as those of the CPU 201 to the display unit 206, and the bus 210 described with reference with FIG. 2, and thus a description thereof is omitted. The network unit 307 is a unit for connecting to the image forming apparatus 101.

FIG. 4 is a diagram illustrating a software configuration of the image forming apparatus 101. As shown in FIG. 4, the image forming apparatus 101 includes a screen controlling unit 401, an information processing unit 402, a DB processing unit 403, a distribution update unit 404, and a manual update unit 405. Programs for realizing each configuration unit shown here are stored on the HDD 204. The CPU 201 loads the programs into the RAM 203, executes them so that each configuration unit is realized.

The screen controlling unit 401 controls menu display for performing distribution reservation of firmware. The information processing unit 402 performs temporarily storage of information or calculation. The DB processing unit 403 manages version information for firmware to be transmitted to the distribution system 102. The distribution update unit 404 provides a function for acquiring firmware from the distribution system 102. The manual update unit 405 provides a function by which a user manually performs update using a CD, a service tool, or the like.

FIG. 5 is a diagram illustrating a software configuration of the distribution system 102. As shown in FIG. 5, the distribution system 102 includes a screen controlling unit 501, an information processing unit 502, and a DB processing unit 503. Programs for realizing each configuration unit shown here are stored on the HDD 304. The CPU 301 loads the programs into the RAM 303 and executes them so that each configuration unit is realized.

The screen controlling unit 501 controls menu display for performing distribution reservation of firmware. The information processing unit 502 performs temporary storage of information or calculation. The DB processing unit 503 performs reference or registration of DB information retained in the distribution system 102. The distribution system described above manages a combination of firmware and a distribution schedule, and has a configuration in which a server that has a UI for the combined management and a storage server that accumulates the firmware are realized by one server. However, the configuration is not limited thereto, the present invention described in this specification can be applied in even a configuration that is realized by separating the server for management from the storage server.

FIG. 6 illustrates a DB 600 stored on the HDD 304 of the distribution system 102. The DB 600 manages a model name 601 and an individual number 602 of the image forming apparatus 101. Here, assume that a service person or the like manually updates contents in the DB 600 via the operation unit 305. Models 611 to 613 are examples of information registered by the service person. A model A 611 indicates the image forming apparatus 101 having the individual numbers from AAA00000 to AAA99999. A model B 612 indicates the image forming apparatus 101 having the individual numbers from BBB00000 to BBB99999. The model C 613 indicates the image forming apparatus 101 having the individual numbers from CCC00000 to CCC99999.

FIG. 7 illustrates a DB 700 stored on the HDD 304 of the distribution system 10. The DB 700 manages an individual number 701 of the image forming apparatus 101 and a version 702 of already installed firmware. Here, assume that contents of the DB 700 are automatically updated by an individual number and version information transmitted from the image forming apparatus 101. Although the individual number 701 and the version 702 can be updated on the distribution system 102 side, the service person has to manually input and update the individual number 701 and the version 702. Thus it is suitable to update them automatically by waiting for a notice from the image forming apparatus 101. A particular update flow of the DB 700 is described below with reference to FIG. 10. An individual number 711 indicates that the firmware is a version 19.00 that has already been installed in the image forming apparatus 101 having the individual number "AAA00000". The individual number 712 indicates that the firmware is a version 1.00 that has already been installed into the image forming apparatus 101 having the individual number "BBB11111". The individual number 713 indicates that the firmware is a version 1.00 that has already been installed into the image forming apparatus 101 having the individual number "CCC11111".

FIG. 8 illustrates a DB 800 stored on the HDD 304 of the distribution system 102. The DB 800 manages a model name 801 of the image forming apparatus 101 and a corresponding version 802 for an application time designating function. Version information for specific firmware relating to a function that performs time designation is registered with an attribute value of the application time designating function 802. Assume that contents of the DB 800 are automatically updated using the individual number, flag information indicating the application time designating function received from the image forming apparatus 101, and contents of the DB 600. Although setting which model has the application time designating function from which version is possible on the distribution system 102, a service person has to manually input this. Thus, this is suitable for automatic update by waiting for a notice from the image forming apparatus 101. A particular update flow of the DB 800 will be given below with reference to FIG. 11. A model A 811 indicates that the model A has the application time designating function of firmware subsequent to a version 10.00. The model B 812 indicates that the model B has no application time designating function of firmware. The model C 813 indicates that the model B has no application time designating function of firmware.

Figure 9:
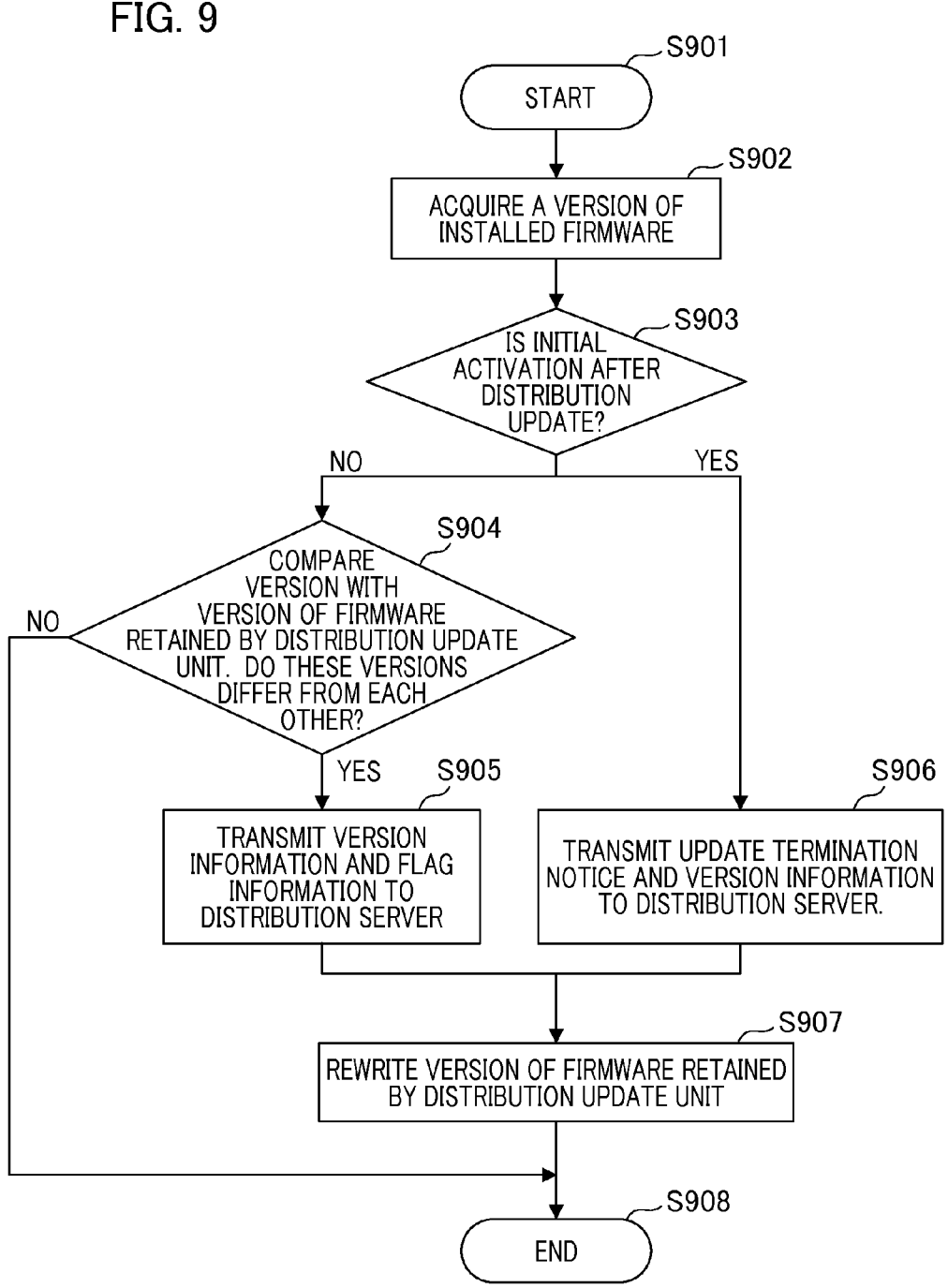
FIG. 9 is a flowchart of processing performed by the image forming apparatus at start-up.

FIG. 9 is a flowchart illustrating processing when the image forming apparatus 101 activates. In S901, the image forming apparatus 101 starts the processing. In S902, the distribution update unit 404 acquires a version of installed firmware from the DB processing unit 403. In S903, the distribution update unit 404 determines whether activation is an initial activation after a distribution update, that is, the activation is an initial activation after firmware has been applied. When activation is the initial activation after a distribution update, the distribution update unit 404 transmits the following information to the distribution system 102 in the initial activation in 906. Specifically, the distribution update unit 404 transmits, to the distribution system 102, an update termination notice, version information for installed firmware, and flag information when the firmware has the application time designating function. In S907, the DB processing unit 403 rewrites the firmware version retained in the distribution update unit 404 with the version acquired in S902. Then, the processing ends in S908.

When activation is not the initial activation after a distribution update, the DB processing unit 403 compares the firmware version retained in the distribution update unit 404 with the firmware version acquired in S902 so as to check whether the versions differ from each other in S904. When both versions are the same, the processing ends in S908. When both versions differ, it means that an update has been performed for a reason other than a distribution update, and the distribution update unit 404 transmits version information and flag information to the distribution system 102 in S905. Then, in S907, the DB processing unit 403 rewrites the firmware version retained in the distribution update unit 404 with the version acquired in S902. Then, the processing ends in S908.

Figure 10:
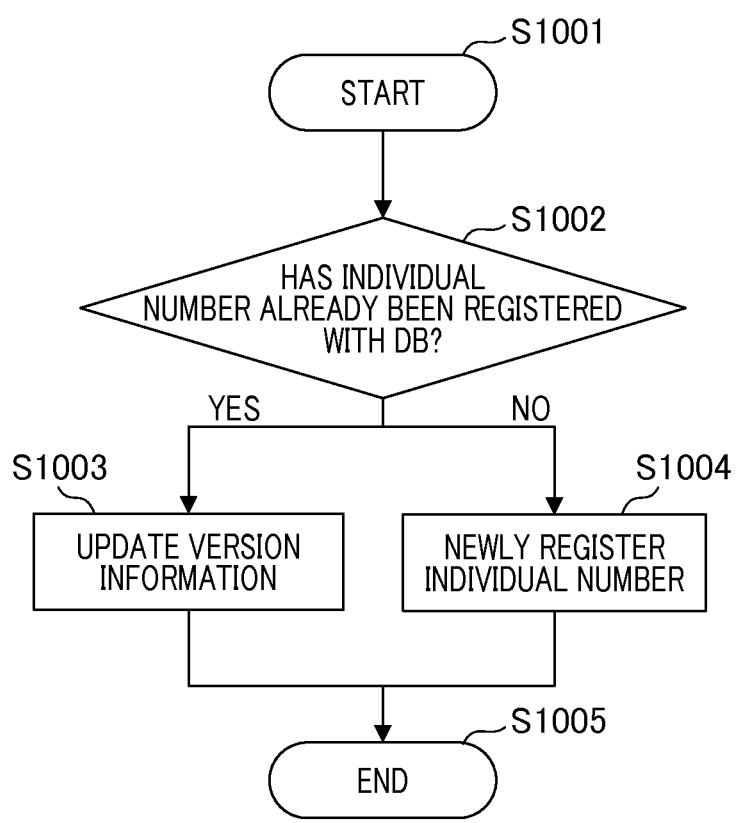
FIG. 10 is a flowchart of update processing of a DB 700 by the distribution system.

FIG. 10 is updating processing of the DB 700 performed by the distribution system 102. The information processing unit 502 receives information from the image forming apparatus 101, and the processing starts in S1001. In S1002, the DB processing unit 503 determines whether the individual number 701 has been already been registered with DB 700. When the individual number 701 has already been registered, the DB processing unit 503 updates a version 702 associated with the registered individual number 701 in S1003. When the individual number 701 is unregistered, the DB processing unit 503 newly registers the individual number 701 and the version 702 in S1004. Then, the processing ends in S1005.

FIG. 14 illustrates examples of the DB 700 that is obtained as the result of the processing in FIG. 10. FIG. 14A illustrates the state before the update processing. FIG. 14A indicates that the image forming apparatus of an individual number 1401 "AAA00000" has a version "19.00". FIG. 14A also indicates that the image forming apparatus of an individual number 1402 "BBB11111" has a version "1.00". When an individual number "CCC11111" and a version "2.00" have been received from the image forming apparatus 101 in the state shown in FIG. 14A, the DB processing unit 503 updates the DB 700 as shown in FIG. 14B. Specifically, the DB processing unit 503 adds "CCC11111" in an individual number 1403 and "2.00" in the version 702.

When the individual number "CCC11111" and a version "3.00" have been received from the image forming apparatus 101 in the state shown in FIG. 14B, the DB processing unit 503 updates the DB 700 as shown in FIG. 14C. Specifically, the DB processing unit 503 updates the version 702 of the individual number 1403 to "3.00".

Figure 11:
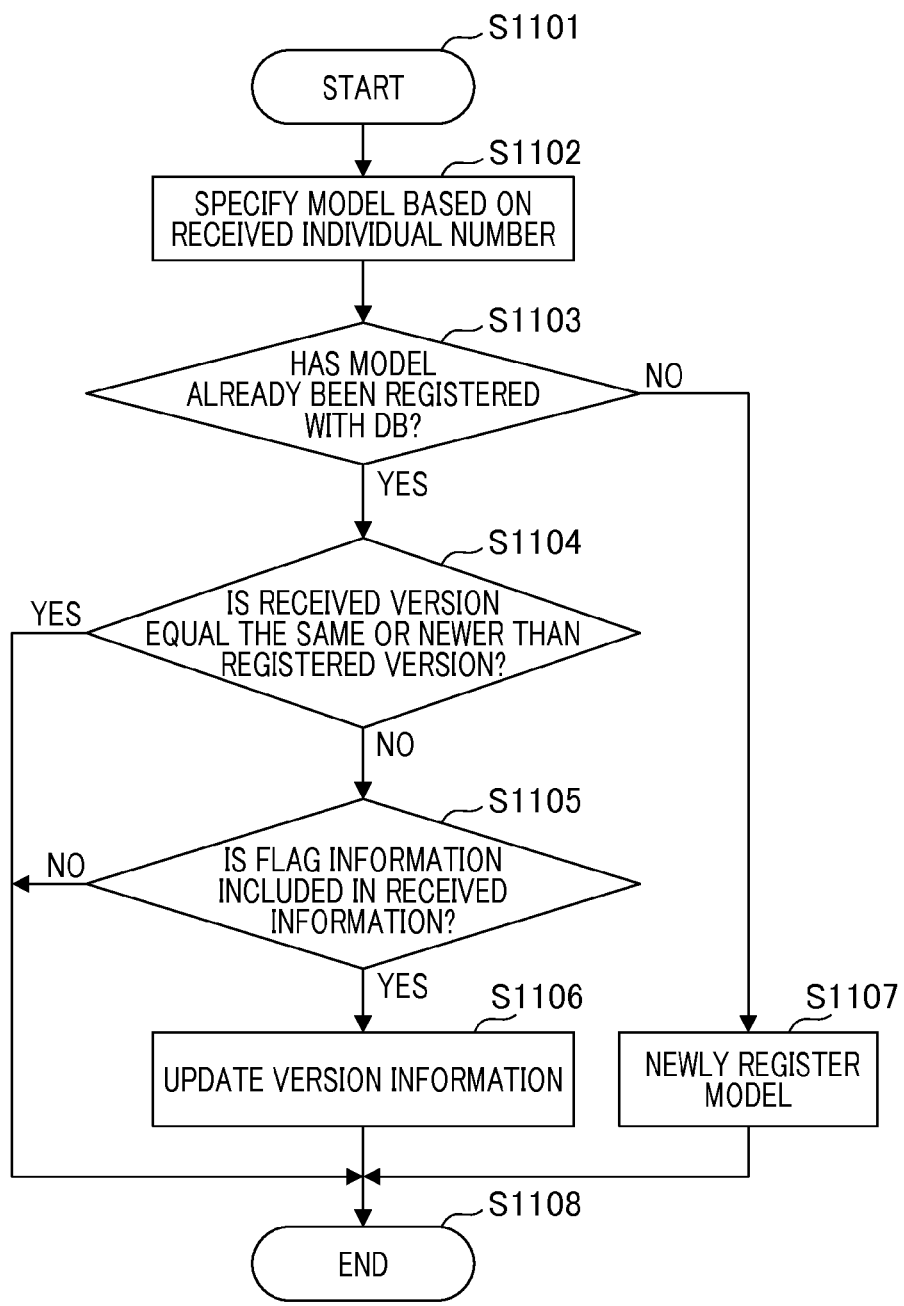
FIG. 11 is a flowchart of update processing of a DB 800 by the distribution system.

FIG. 11 illustrates update processing of the DB 800 by the distribution system 102. The information processing unit 502 receives information from the image forming apparatus 101, and the processing starts in S1101. In S1102, the DB processing unit 503 specifies a model 1601 via the DB 600 based on the individual number 602 received from the image forming apparatus 101. In S1103, the DB processing unit 503 refers to the DB 800 to thereby determine whether the model 1601 specified in S1102 has been registered. When the mode 1601 is unregistered, in S1107, the DB processing unit 503 newly registers the model 1601 specified in S1102, and the corresponding version when flag information is included in the received information, and the processing ends in S1108.

When the model 1601 has been registered, the DB processing unit 503 determines whether the version received from the image forming apparatus 101 is the same as or newer than the version associated with the model registered with the DB 800 in S1104. When the version is equal to or greater than the registered version, the processing ends in S1108. When the version is newer than the registered version, the DB processing unit 503 determines whether flag information is included in the information received from the image forming apparatus 101 in S1105. When no flag information is included, the processing ends in S1108. When the flag information is included, the DB processing unit 503 updates version information in the DB 800 in S1106, and the processing ends in S1108.

FIG. 15 illustrates examples of the DB 800 obtained as the result of the processing in S1107 in FIG. 11. FIG. 15A indicates that a model A 1501 has the application time designating function subsequent to a version 10.00. FIG. 15A indicates that a model B 1502 does not have the application time designating function. When the individual number "CCC11111", the version "2.00", and the "flag" have been received from the image forming apparatus 101 in the state shown in FIG. 15A, the DB processing unit 503 updates the DB 800 as shown in FIG. 15B. Specifically, the DB processing unit 503 firstly refers to the DB 600 so as to specify the model name of the individual number "CCC11111". In the case of the model C as shown in FIG. 6, the DB processing unit 503 newly registers the fact that the model C has the application time designating function subsequent to the version 2.00 in a record 1503.

Also, when the individual number "CCC11111" and the version "2.00" without the flag from the image forming apparatus 101 in the state shown in FIG. 15A is received, the DB processing unit 503 updates the DB 800 as shown in FIG. 15C. Specifically, the DB processing unit 503 firstly refers to the DB 600 so as to specify the model name of the individual number "CCC11111". In the case of the model C, the DB processing unit 503 registers the fact that the model C has no application time designating function in the record 1503.

FIG. 16 illustrates examples of the DB 800 obtained as the result of the processing in S1105 in FIG. 11. FIG. 16A indicates that the model A 1601 has the application time designating function subsequent to the version 10.00. FIG. 16A also indicates that the model B 1602 has no application time designating function. FIG. 16A also indicates that the model C 1601 has the application time designating function subsequent to the version 2.00. When the individual number "CCC11111", the version "1.00", and the "flag" have been received from the image forming apparatus 101 in a state shown in FIG. 16A, the DB processing unit 503 updates the DB 800 as shown in FIG. 16B. Specifically, the DB processing unit 503 firstly refers to the DB 600 so as to specify the model name of the individual number "CCC11111". In the case of the model C, the DB processing unit 503 refers to the model C 1603 indicating registered information for the model C. In accordance with the processing in S1104, the DB processing unit 503 adds the fact that the model C has the application time designating function subsequent to the version "1.00" to the record 1603 since the notified version "1.00" is lower/older than the registered version"2.00".

When the individual number "CCC11111" and the version "3.00" without the flag have been received from the image forming apparatus 101 in the state shown in FIG. 16A, the DB processing unit 503 does not update the DB 800 as shown in FIG. 16C. When the individual number "CCC11111", and the version "3.00" without the "flag" have been received from the image forming apparatus 101 in the state shown in FIG. 16A, the DB processing unit 503 does not update the DB 800 as shown in FIG. 16C. In other words, the DB processing unit 503 updates the managed version with the acquired version information when the acquired version information is older than the version of the managed and specific firmware, and compatible with time designation. With the aforementioned processing, automatic update is enabled without updating version information by a service person on the distribution system side.

Figure 12:
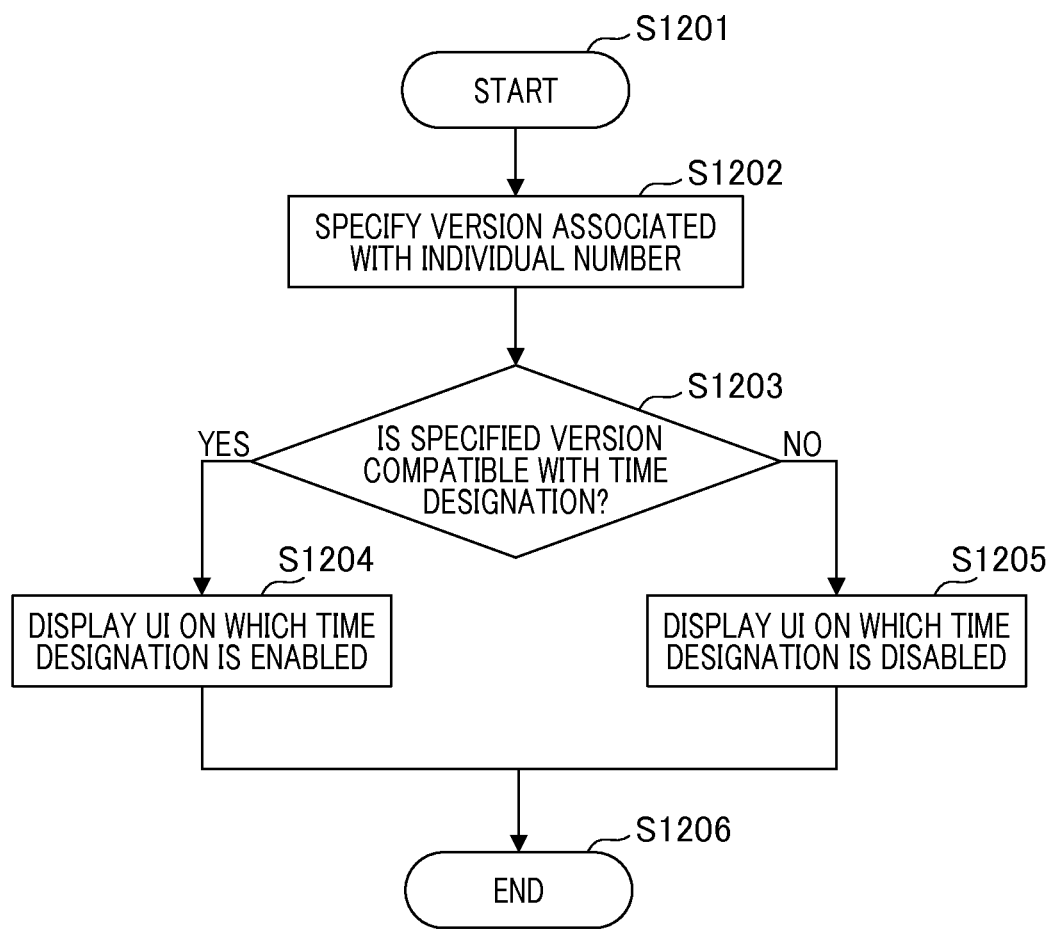
FIG. 12 is a flowchart of display processing of a distribution reservation screen by the distribution system.

FIG. 12 is a flowchart for determining whether a distribution reservation screen is displayed in the distribution system 102. When a user tries to open a distribution reservation setting screen by operating the operation unit 205 of the image forming apparatus 101, the image forming apparatus 101 starts the processing in S1201. In S1202, the DB processing unit 503 refers to the DB 700 so as to specify a firmware version associated with an individual number for performing distribution reservation. In S1203, the DB processing unit 503 refers to the DB 800 so as to confirm whether the version specified in S1202 has an application time designation. When the version has the application time designating function, the screen controlling unit 501 displays a UI on which the display application time designation is enabled in S1204, and the processing ends in S1206. When the version does not have the application time designating function, the screen controlling unit 501 displays a UI on which the application time designation is disabled in S1205, and the processing ends. With this processing, a version upgrade setting screen appropriate to the image forming apparatus can be provided based on version information for firmware that enables the time designation.

Even if the designated application time arrives, there is a case where the download of firmware is incomplete, or a case where the firmware cannot be applied because the power source of the image forming apparatus 101 has turned off. The image forming apparatus 101 executes the processing exemplified below depending on a processing content.

After the time designation of the firmware is performed, and in the case where the download of the firmware is incomplete at the application time but the download is complete within a predefined time after the application time, for example, within N minutes, the distribution update unit 404 applies the firmware of which the download has completed. Also, in the case where the power source of the image forming apparatus 101 is turns off at the distribution time but the power source of the image forming apparatus 101 turns on within N minutes after the distribution time, the distribution update unit 404 downloads the firmware. Similarly, in the case where the power source of the image forming apparatus 101 turns off at the application time but the power source of the image forming apparatus 101 turns on within N minutes after the application time, the distribution update unit 404 applies the firmware after the image forming apparatus 101 turns on. Whereas, an elapsed time after the application time exceeds N minutes, the distribution update unit 404 cancels application of the firmware in any case. In this case, for example, the distribution update unit 404 may save the downloaded firmware so that a user manually provides instruction that the firmware be applied later or designates the application time again. Note that a setting screen for performing a manual application instruction of the firmware or re-designation of the application time can be locally provided by the image forming apparatus 101, or can be remotely provided form the distribution system 102 to the image forming apparatus 101.

FIG. 13 illustrates a flowchart for recovery processing when the manual application or the re-designation of the application time is performed in the case where the image forming apparatus 101 has failed to apply the firmware at the application time designated on the image forming apparatus 101. The image forming apparatus 101 starts the processing in S1301. In S1302, the distribution update unit 404 determines whether a check has been added to "downloaded firmware is applied without fail" (distribution setting screens 1708 and 1808 discussed below) on a screen for reserving the application time (distribution setting screens 1700 and 1810 discussed below). When the check has been added, the distribution update unit 404 applies the downloaded firmware in S1307, the processing ends in S1308.

When no check has been added, the distribution update unit 404 acquires the latest firmware version from the distribution system 102 in S1303. In S1304, the distribution update unit 404 determines whether the version acquired in S1303 is newer than the version of the downloaded firmware. When the acquired version is not newer than the version of the downloaded firmware, the distribution update unit 404 applies the downloaded firmware in S1307, the processing ends in S1308. When the acquired version is newer than the version of the downloaded firmware, the distribution update unit 404 deletes the downloaded firmware in S1305. In S1306, the distribution update unit 404 requests the distribution system 102 for firmware, and downloads the latest firmware. Then, the distribution update unit 404 applies the downloaded firmware in S1307, and the processing ends in S1308. With this processing, the processing can be recovered in the case where the image forming apparatus failed to download or apply the firmware at the designation time.

The following configuration may be applied as another embodiment when the image forming apparatus has failed to apply the firmware at the designated application time. That is, the distribution update unit 404 provides instructions for the application of the firmware at the same time of next day or after one week, or when the image forming apparatus 101 activates next, and performs the flow in FIG. 13.

Figure 17:
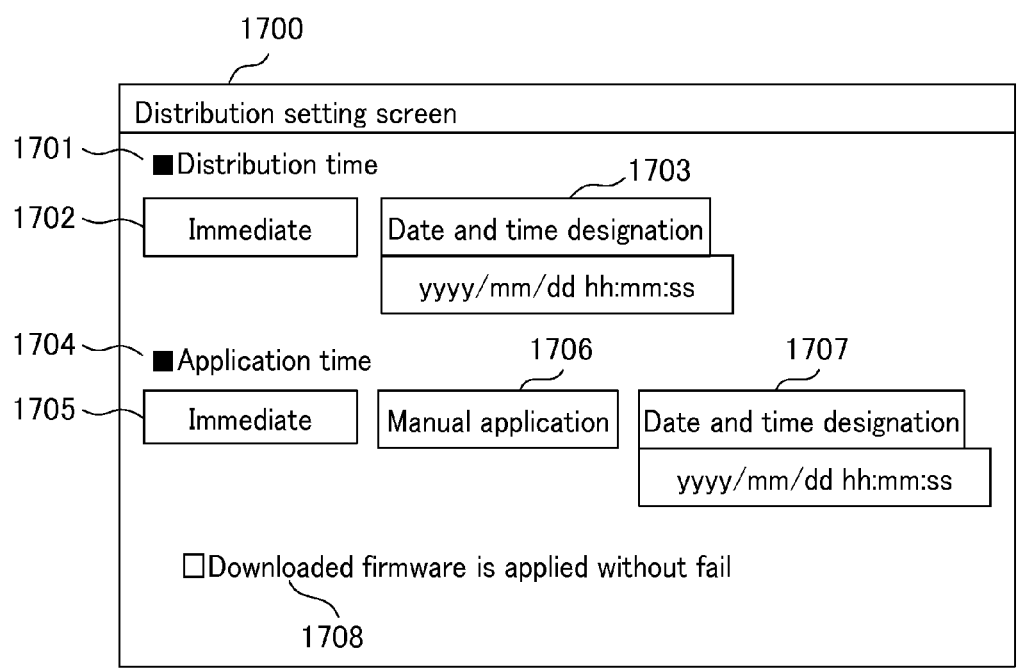
FIG. 17 illustrates an example of a distribution setting screen in the image forming apparatus.

The distribution setting screen 1700 shown in FIG. 17 is an example of a setting screen for the distribution time and the application time for the firmware of the image forming apparatus 101. A plurality of setting items for providing options about a distribution setting with a user is displayed on the distribution setting screen 1700. The distribution time 1701 is a menu for setting the distribution time of the firmware. When an immediate item 1702 is selected, the firmware is immediately downloaded after the setting. When a date and time designation 1703 is selected, the firmware is downloaded at the set time. An application time 1704 is a menu for setting the application time. When a user selects an immediate time 1705, the distribution update unit 404 of the image forming apparatus 101 applies the firmware at the time when the firmware is downloaded, that is, immediately applies the firmware after download is completed. When a user selects a manual application 1706, the manual update unit 405 of the image forming apparatus 101 remains an application waiting state after the download is completed. When a date and time designation 1707 is selected, the firmware is applied at the set time.

"Downloaded firmware is applied without fail" 1708 is information that is used when the processing of the flowchart in FIG. 13 is performed in the case where the image forming apparatus 101 failed to apply the firmware at the set application time, and the application instruction is made later. When a check is added to a check box, the downloaded firmware is applied. When no check is added to the check box, the distribution update unit 404 confirms whether the firmware of the latest version exists, and re-downloads the firmware of the latest version, if any.

Figure 18A:
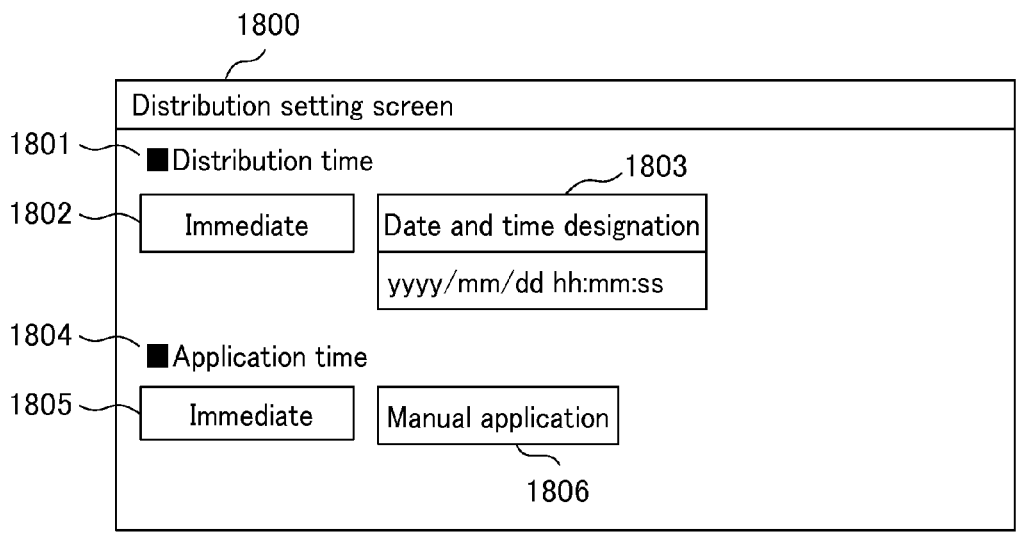
FIG. 18A and FIG. 18B illustrate examples of distribution setting screens in the distribution system.
Figure 18B:
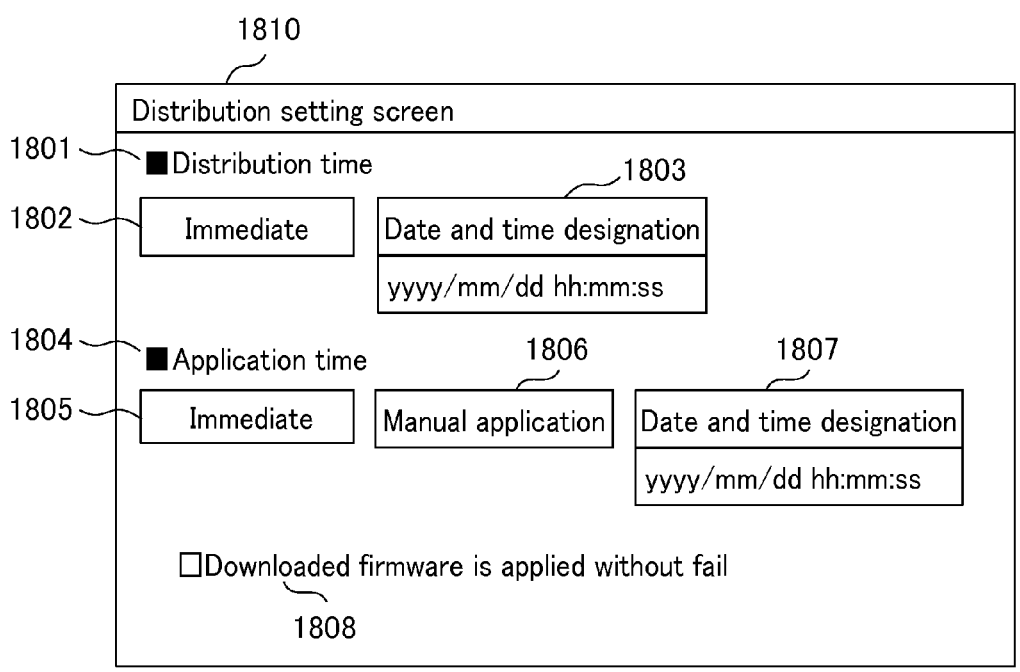

Distribution setting screens 1800 and 1810 shown in FIG. 18A and FIG. 18B are examples of setting screens for the distribution time and the application time of the firmware that are remotely performed from the distribution system 102 to the image forming apparatus 101. A plurality of setting items for providing options for a distribution setting with a user are displayed on the distribution setting screens 1800 and 1810. FIG. 18A is the distribution setting screen transmitted to the image forming apparatus 101 not having the application time designating function in S1205 in FIG. 12. FIG. 18B is the distribution setting screen transmitted to the image forming apparatus 101 having the application time designating function in S1204.

A distribution time 1801 is a setting menu for the distribution time for the image forming apparatus 101 not having the application time designating function. When a user selects an immediate time 1802, the distribution update unit 404 immediately downloads the firmware after the setting. When a user selects a date and time 1803, the distribution update unit 404 downloads the firmware at the set time. An application time 1804 is a menu for setting the application time of the firmware. When a user selects an immediate time 1805, the distribution update unit 404 immediately applies the firmware after download is completed. When a user selects a manual application 1806, the manual update unit 405 remains in an application waiting state after download is completed.

The distribution time 1810 of FIG. 18B is a setting menu of the distribution time displayed in the case of the image forming apparatus 101 having the application time designating function. Unlike the screen shown in FIG. 18A, setting items 1807 and 1808 are additionally displayed on the distribution setting screen 1810. When a user selects a date and 1807, the distribution update unit 404 applies the firmware at the set time. "Downloaded firmware is applied without fail" 1808 is information that is used when the processing of the flowchart in FIG. 13 is performed in the case where the image forming apparatus 101 failed to apply the firmware at the set application time and the application instruction is made later. When a user adds a check to the check box, the distribution update unit 404 immediately applies the downloaded firmware. When a user does not add a check to the check box, the distribution update unit 404 confirms whether the firmware of the latest version is in the distribution system 102, and re-downloads the firmware, if any. As described above, according to the network system of the present invention, an appropriate version upgrade setting screen can be provided with the image forming apparatus by managing version information for firmware that enables the time designation. Also, the application processing can be recovered in the case where the image forming apparatus failed to download the firmware at the designated time.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-165170, filed Aug. 8, 2013 which is hereby incorporated by reference herein in its entirety.

What is claimed is:

1. A network system comprising a plurality of image forming apparatuses and a distribution system that manages firmware of the plurality of image forming apparatuses,
wherein the plurality of image forming apparatuses comprises:
a requesting unit configured to request the distribution system for firmware;
an acquiring unit configured to acquire the firmware from the distribution system that responds to the request;
an applying unit configured to apply the acquired firmware; and
a notifying unit configured to notify the distribution system of a notice including version information for specific firmware and flag information relating to a function that performs time designation that the applying unit applies,
wherein the distribution system comprises:
a managing unit configured to manage the version information for the specific firmware of each of the plurality of image forming apparatuses based on version information and flag information included in a notice by the notifying unit of each of the plurality of image forming apparatuses; and a providing unit configured to provide a screen for performing a distribution setting of the firmware with any one of the plurality of image forming apparatuses, wherein the providing unit provides a first screen on which the time designation for applying the firmware is enabled, or a second screen on which the time designation is disabled by switching the screens for each of the plurality of image forming apparatuses based on the version information for the specific firmware managed by the managing unit, and wherein at least one of the requesting unit, the acquiring unit, the applying unit, the notifying unit, the managing unit, and the providing unit is implemented by a processor and a memory.

2. The network system according to claim 1, wherein time designation for downloading the firmware is further enabled in the first screen provided by the providing unit.

3. The network system according to claim 1, wherein the applying unit applies the firmware after a power source of the image forming apparatus turns on in a case where the power source of the image forming apparatus turns off after the time designation for applying the firmware has been set on the first screen but the power source turns on within a predefined time.

4. The network system according to claim 1, wherein the applying unit applies the firmware of which a download is completed in a case where the download of the firmware is completed within a predefined time after the time designation for applying the firmware has been set on the first screen.

5. The network system according to claim 1, wherein in a case where a predefined time has elapsed after a designated time after the time designation for applying the firmware has been set on the first screen but a download of the firmware is incomplete on the image forming apparatus, the providing unit provides a screen for enabling a manual application instruction for the firmware or time designation for applying the firmware again.

6. The network system according to claim 1, wherein in a case where a download of the firmware is incomplete on the image forming apparatus and a predefined time has elapsed after a designated time after the time designation for applying the firmware has been set on the first screen, application of the firmware is canceled in the image forming apparatus.

7. The network system according to claim 1, wherein the managing unit updates the managed version information with the version information included in the notice in a case where the version information included in the notice is older than the version of the managed specific firmware and the flag information included in the notice indicates compatibility of the function that performs the time designation.

8. The network system according to claim 1, wherein the notifying unit notifies the distribution system of the version information for the firmware and information indicating whether or not the version is compatible with the time designation when the image forming apparatus performs initial activation after applying the firmware.

9. The network system according to claim 1, wherein the providing unit provides options including a setting item for applying the firmware at the time when the firmware is downloaded, a setting item for manually providing instructions about the application of the firmware after the firmware is downloaded, or a setting item for providing instructions about the time designation for applying the firmware.

10. A distribution system that manages firmware of a plurality of image forming apparatuses, comprising:

a memory; and a processor in communication with the memory, the processor configured to control:

a managing unit to manage version information for specific firmware based on a notice from each of the plurality of image forming apparatuses, wherein the notice includes version information for the specific firmware and flag information relating to a function that performs time designation that firmware is applied; and a providing unit to provide a screen for performing a distribution setting of the firmware with any one of the plurality of image forming apparatuses, wherein the providing unit provides a first screen on which the time designation for applying the firmware is enabled, or a second screen on which the time designation is disabled by switching the screens for each of the plurality of image forming apparatuses based on the version information for the specific firmware managed by the managing unit, and wherein the managing unit updates the managed version information with the version information included in the notice in a case where the version information included in the notice is older than the version of the managed specific firmware and the flag information included in the notice indicates compatibility of the function that performs the time designation.

11. A control method in a network system comprising a plurality of image forming apparatuses and a distribution system that manages firmware of the plurality of image forming apparatuses, the control method comprising:

requesting, by the plurality of image forming apparatuses, the distribution system for firmware;

acquiring, by the plurality of image forming apparatuses, the firmware from the distribution system in response to the request;

applying, by the plurality of image forming apparatuses, the acquired firmware;

notifying, by the plurality of image forming apparatuses, the distribution system of a notice including version information for specific firmware and flag information relating to a function that performs time designation;

managing, by the distribution system, the version information for the specific firmware of each of the plurality of image forming apparatuses based on version information and flag information included in the notice notified by each of the plurality of image forming apparatuses; and providing a screen for performing a distribution setting of the firmware with any one of the plurality of image forming apparatuses, wherein, in the providing step, a first screen on which the time designation for applying the firmware is enabled, or a second screen on which the time designation is disabled is provided by switching the screens for each of the plurality of image forming apparatuses based on the managed version information for the specific firmware.

12. A control method in a distribution system that manages firmware of a plurality of image forming apparatuses, comprising:

managing version information for specific firmware of each of the plurality of image forming apparatuses based on a notice from each of the plurality of image forming apparatus, wherein the notice includes version information for the specific firmware and flag information relating to a function that performs time designation that firmware is applied; and providing a screen for performing a distribution setting of the firmware with any one of the plurality of image forming apparatuses, wherein, in the providing step, a first screen on which the time designation for applying the firmware is enabled, or a second screen on which the time designation is disabled is provided by switching the screens for each of the plurality of image forming apparatuses based on the managed version information for the specific firmware, and wherein the managed version information is updated with the version information included in the notice in a case where the version information included in the notice is older than the version of the managed specific firmware and the flag information included in the notice indicates compatibility of the function that performs the time designation.

13. A non-transitory storage medium on which is stored a computer program for making a computer execute a control method in a distribution system that manages firmware of a plurality of image forming apparatuses, comprising:

managing version information for specific firmware of each of the plurality of image forming apparatuses based on a notice from each of the plurality of image forming apparatus, wherein the notice includes version information for the specific firmware and flag information relating to a function that performs time designation that firmware is applied; and providing a screen for performing a distribution setting of the firmware with any one of the plurality of image forming apparatuses, wherein, in the providing step, a first screen on which the time designation for applying the firmware is enabled, or a second screen on which the time designation is disabled is provided by switching the screens for each of the plurality of image forming apparatuses based on the managed version information for the specific firmware, and wherein the managed version information is updated with the version information included in the notice in a case where the version information included in the notice is older than the version of the managed specific firmware and the flag information included in the notice indicates compatibility of the function that performs the time designation.

* * * * *